(12) United States Patent
Allison, III (10) Patent No.: US 9,353,994 B1
(45) Date of Patent: May 31, 2016

(54) AIR POLLUTION CONTROL SYSTEM AND METHOD

(71) Applicant: Robert D. Allison, III, Las Vegas, NV (US)

(72) Inventor: Robert D. Allison, III, Las Vegas, NV (US)

(73) Assignee: Particulate Matter Solutions, LLC, Albany, GA (US)

( * ) Notice: Subject to any disclaimer, the term of this patent is extended or adjusted under 35 U.S.C. 154(b) by 0 days.

(21) Appl. No.: 14/101,420

(22) Filed: Dec. 10, 2013

(51) Int. Cl.
*B01D 47/00* (2006.01)
*F28C 1/00* (2006.01)
*F24F 7/00* (2006.01)
*F24F 13/02* (2006.01)

(52) U.S. Cl.
CPC . *F28C 1/00* (2013.01); *B01D 47/00* (2013.01); *F24F 7/00* (2013.01); *F24F 13/02* (2013.01)

(58) Field of Classification Search
None
See application file for complete search history.

(56) References Cited

U.S. PATENT DOCUMENTS

| | | | | |
|---|---|---|---|---|
| 3,957,464 | A * | 5/1976 | Teller | B01D 47/12 95/196 |
| 4,209,502 | A * | 6/1980 | Pircon | 423/659 |
| 4,744,958 | A * | 5/1988 | Pircon | 422/606 |
| 2004/0118280 | A1* | 6/2004 | Tinguee, Jr. | B01D 49/00 95/187 |
| 2010/0107939 | A1* | 5/2010 | Tsutsumi | B01D 53/504 110/216 |
| 2011/0139004 | A1* | 6/2011 | Jacobsen | B01D 45/12 95/216 |

* cited by examiner

*Primary Examiner* — Duane Smith
*Assistant Examiner* — Phillip Shao
(74) *Attorney, Agent, or Firm* — Gregory T. Ourada; Hill, Kertscher & Wharton, LLP (57) ABSTRACT

A system for large-scale, distributed remediation of particulate air pollution using cooling towers is described herein. The system consists of a generator section which captures, redirects, and accelerates exhaust air from a cooling tower, a venturi inlet and nozzle, and at least one air scrubber stage.

7 Claims, 7 Drawing Sheets

AIR POLLUTION CONTROL SYSTEM AND METHOD

CROSS REFERENCE TO RELATED APPLICATIONS

Not Applicable

STATEMENT REGARDING FEDERALLY-SPONSORED RESEARCH OR DEVELOPMENT

Not Applicable

BACKGROUND OF THE INVENTION

Air pollution is a major global problem. Although breathing-related illness and poor air quality are a global problem, some parts of the world are particularly affected. Some of the worst air quality in the word exists in major metropolitan areas. Cities like Los Angeles, London, Mexico City, Beijing, and New Delhi are examples of major metropolitan areas with exceptionally poor air quality.

An estimated 3.2 million people died prematurely in 2010 because of the poisonous effects of outdoor air pollution, according to the findings of an exhaustive study of global causes of death published in an issue of the British medical journal *Lancet*. Two-thirds of those killed by air pollution lived in Asia, where air quality continues to deteriorate.

According to recent studies in the U.S., the total annual cost of providing healthcare related to all respiratory conditions, excluding lung cancer, was $113 billion. The study further estimated that the cost to American society, in terms of lost productivity as a result of disability and early death due to respiratory disease, amounted to an additional $67 billion.

The Environmental Protection Agency (EPA) groups particle pollution into two categories. Inhalable particles classified as "coarse", such as those found near roadways and dusty industries, are between 2.5-10 micrometers in diameter. Fine particles, such as those found in smoke and haze, are smaller than 2.5 micrometers in diameter. These particles can be directly emitted from sources such as forest fires, or they can form when gases are emitted from power plants. The size of particles is directly linked to their potential for causing health problems. The EPA is concerned about particles that are smaller than 10 micrometers in diameter because those are the particles that generally pass through the throat and nose and enter the lungs. Once inhaled, these particles can affect the heart and lungs and cause serious health effects. Particulate matter in the air is directly linked to breathing and health problems of varying severity depending upon the time and level of exposure. The ability to remove particulate matter from the air in and around cities represents a potential saving in the tens of billions in reduced healthcare costs to the U.S. GDP.

While industrially-generated pollutants (e.g. both gaseous pollutants such as CO2, as well as particulate pollutants) can be—and are often mandated to be—remediated at the source, the majority of particulate pollution sources do not lend themselves to this means of remediation. Instead, particulate air pollution must be treated after it has been released and been diffused into the atmosphere, often a great distance from the source. This creates certain problems.

First, it is easier to remediate air pollution at the source because industrial pollutant exhaust gases can be routed through remediation means before being released into the atmosphere, i.e. before they go through the exhaust stack. However, particulate pollutants such as smoke and asphalt dust are often generated over wide areas, which does not lend itself to easy control. Particulate pollution is therefore dispersed in a huge volume of air. For example, assuming that most pollutants are contained below 30,000 ft, the volume of polluted air in a large metropolitan area with a 30 mi radius is $2.3 \times 10^{15}$ ft$^3$ or about 15,000 cubic miles. Being able to capture and effectively channel this huge volume of polluted air through remediation means is a major problem.

Obviously, one way to do this would be at a single remediation site. However, unless the site is of gigantic proportions, it is very unlikely that such single-site remediation is going to be effective, simply because of the vast volumes of air involved, and because of the vagaries of air current and atmospheric conditions. Moreover, building and operating such a large-scale remediation facility would be costly, which makes construction of such a facility with public funds politically challenging. The high cost of such a facility (aside from the physical plant itself) results largely from the difficulty of finding enough suitable land in the right location in metropolitan areas, where land is at a premium, and therefore expensive.

A widely-distributed method of remediating particulate air pollution is therefore a more desirable solution. Not only does such a method circumvent the difficulty in finding a suitable single site and the cost of building such a facility, but a distributed method also allows a greater volume of polluted air to be accessed and processed. However, a widely-distributed method would require a remediation means that is easily dispersible among already-existing urban infrastructure so that its installation involves the minimum of disruption to the public. Ideally, it would involve a device that can be retrofitted to existing devices that handle relatively large volumes of air. In addition, it must be a device whose use can be mandated, to ensure that its use is widespread. The success of automobile catalytic converters in reducing auto emissions is instructive. These were successful in reducing air pollution from automobiles in part because their use was mandated by law.

What is therefore needed is a method of remediating particulate air pollution that is able to be retrofitted to existing devices that move large amounts of air, inexpensive, and whose use could easily be mandated.

BRIEF SUMMARY OF THE INVENTION

The invention described herein is an air scrubbing device intended for use with HVAC cooling towers on commercial buildings worldwide.

Cooling towers are used to remove heat from large air conditioning units for both climate control and machinery used in manufacturing. Using cooling towers to facilitate remediation of large-scale particulate air pollution is ideal because large concentrations of people (and the associated high concentrations of air pollution) mean that there is a high concentration of cooling towers available in the locations where air pollution is most severe. An added benefit of using cooling towers to draw air into the scrubber units is that the primary function of these fans means that the user is already paying for the electricity to operate them.

The invention is an air scrubber unit which repurposes the exhaust of building cooling tower fans and uses venturi and forced air effects to draw in polluted ambient air from the atmosphere. Cooling tower fan exhaust is captured by a nautilus-shaped generator installed in the exhaust airstream, which redirects and accelerates air through a nozzle/venturi assembly which creates a negative pressure gradient that draws in polluted ambient air from the atmosphere. Particulate matter in the intake air is then cleaned by a water curtain (i.e. high-pressure water mist) in one or more scrubber assemblies and the cleaned air is exhausted back to the atmosphere. Water for the water curtain is first drawn from the cooling tower base. The water used to scrub collected particulate matter is then drawn off into drain lines leading to storage tanks. The used water from these tanks is then filtered and pumped back into the cooling tower base. Solid particulate matter left in the collection containers can then be disposed of or recycled. This solid matter can also potentially be recycled and used in a variety of applications (e.g. as fill in road construction).

The air scrubber unit is designed to be retrofitted to existing cooling tower units. The cost to install the air scrubber units themselves is projected to be minimal due to the simplicity of the design and the availability of materials and skilled labor to fabricate and assemble the units. The simplicity of the design means that installation of the air scrubber units can easily be completed by HVAC and cooling tower service personnel.

Moreover, it was found during initial testing that the power consumption of the cooling fans unexpectedly decreased when the air scrubbers were used. That is, it appears that installation of the air scrubber unit causes a cooling fan to operate more efficiently. Therefore, although retrofitting and operating the air scrubber units involves some extra costs, these costs may be offset by potential reductions in the amount of electrical power used.

The amount of air pollution that can be treated with the invention described herein is significant. The average large capacity cooling tower fan envisioned to be the principal application for the invention moves 250,000 cubic feet of air per minute. The most polluted metropolitan areas generally have the highest concentration of large cooling tower fans. Therefore, the cooling towers in metropolitan areas move a very high volume of air carrying particulate air pollution. For example, Las Vegas, Nev. has an estimated 7,000 large capacity cooling towers. Cooling tower fans run continually at full speed during hot months, and run at half speed or for a few hours in any given 24-hour period during the winter months. Even during the cooler times of the year, when half of the cooling towers are running, their running cycle is 24 hours a day, seven days a week, so the total volume of air passing through these is about 280-350 million cubic feet per hour. During hot months, the total volume of air increases to 560-700 million cubic feet per hour.

The goal of the invention is to dramatically reduce the amount of both large and small particulate matter to improve air quality in cities and suburbs by harnessing the exhaust air produced by HVAC cooling towers. It specifically addresses the air quality problem in the areas where people are most densely concentrated and therefore exposed to poor air quality from particulate matter, i.e. cities. The ability to accomplish this is made possible because of the high concentration of cooling towers in cities.

DETAILED DESCRIPTION OF THE INVENTION

Figure 1:
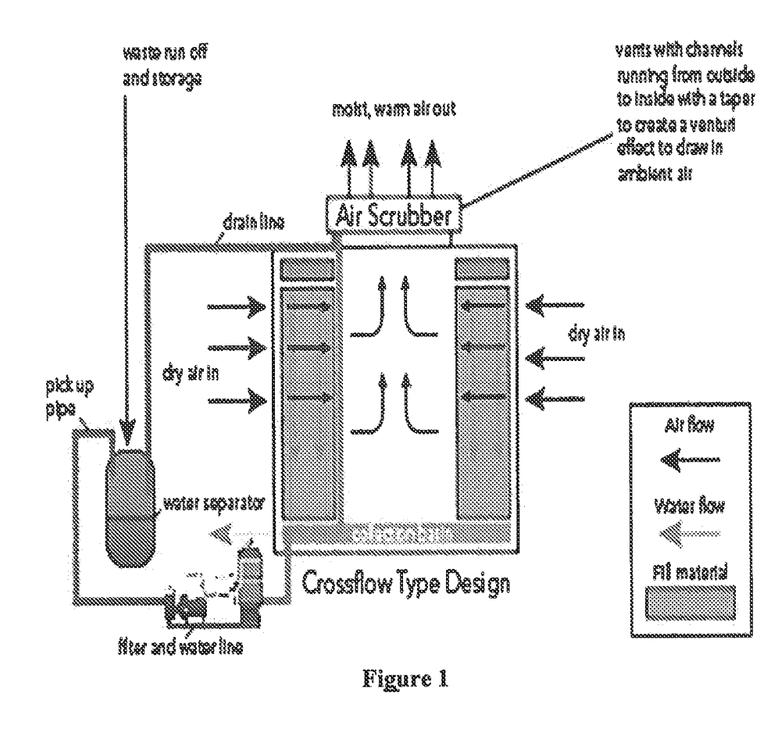
FIG. 1 is a schematic view of the overall system, including cooling towers.

FIG. 1 shows an overall schematic of the system. Exhaust air flow from cooling tower fans passes through the air scrubber, which in turn draws ambient polluted air through the air scrubber. In a preferred embodiment, cooling water from the tower is used in a water-curtain method air purification, in which a misted water is sprayed at pressure into an air stream containing pollutants of the particulate matter variety.

Figure 2:
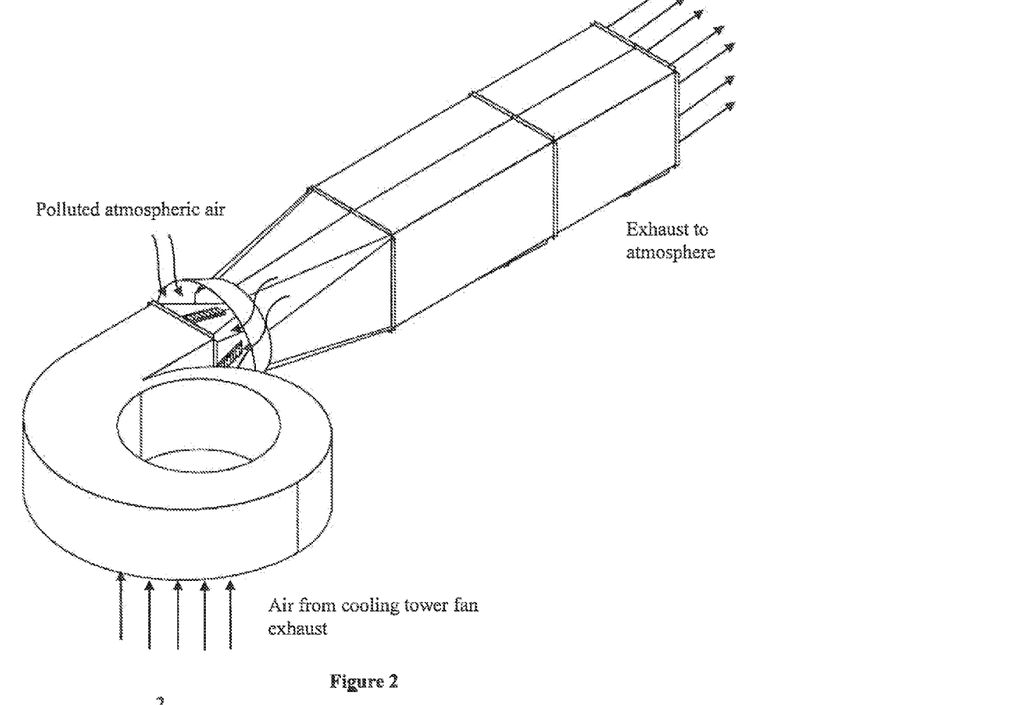
FIG. 2 shows one embodiment (e.g. linear configuration) of the assembled system.
Figure 3:
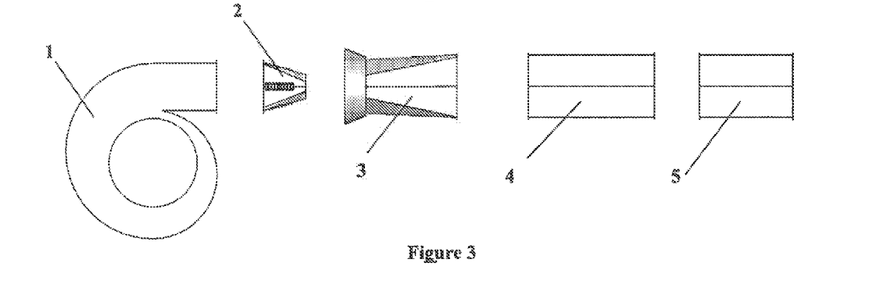
FIG. 3 shows the individual major components of the assembled system.

FIG. 2 shows one preferred embodiment of the invention. Exhaust airflow from the cooling tower is drawn into the generator section, which redirects and accelerates this exhaust airflow through a nozzle which, in conjunction with a venturi intake, creates a negative pressure region in the vicinity of the inlet side of venturi intake and draws atmospheric air into the scrubber section. FIG. 3 shows these components individually. The key components of the invention are the generator 1, nozzle 2, venturi intake 3, and scrubber ducts 4, 5.

Figure 4A:
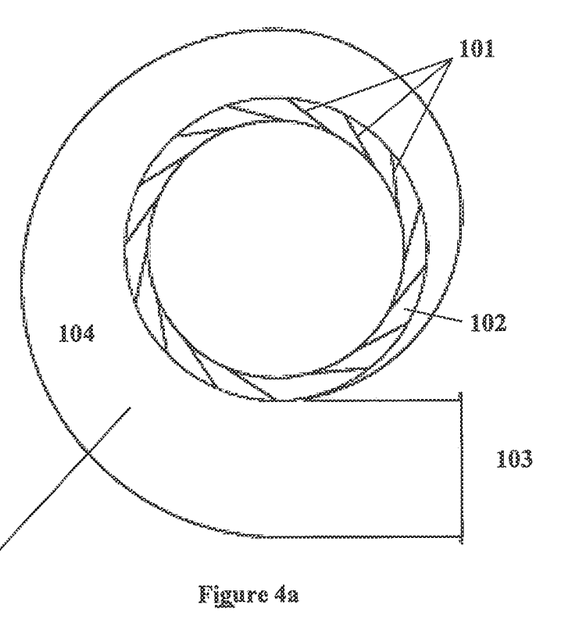
FIGS. 4a and 4b show the bottom and top views, respectively, of the generator.
Figure 4B:
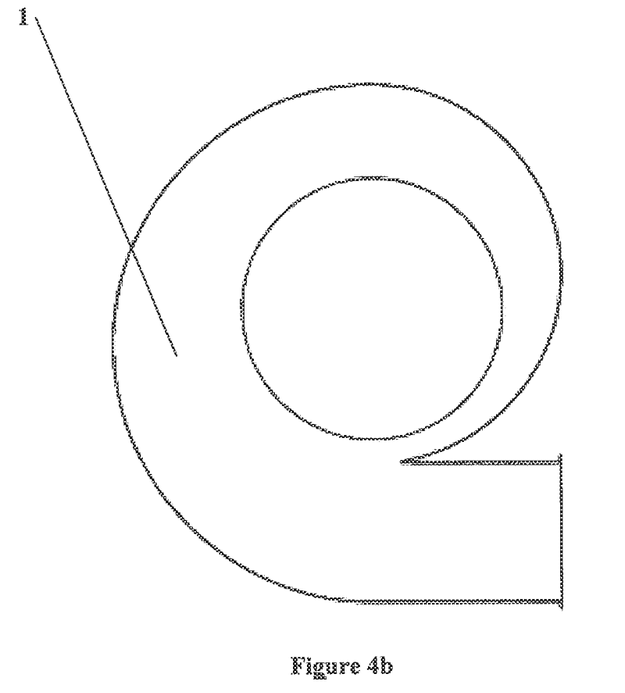

FIG. 4a, 4b show bottom and top views, respectively, of generator 1, which is installed in the path of exhaust from a cooling tower fan. The generator 1 has an annular inlet 102 on its bottom side as shown in FIG. 4a which leads to generator plenum 104. Inlet guide vanes 101 are mounted on the inner circumference of the generator. The angle of the vanes 101 varies from 15 degrees (relative to the tangent to the inner circumference at the point of attachment) at the inlet to 35 degrees at the generator exhaust 103. Vanes 101 redirect the upward flow of air from the cooling tower fan into the plenum, and accelerate the air in the plenum 104 toward the exhaust 103. The plenum 104 of generator 1 increases in width, as can be clearly seen in FIGS. 4a, 4b. In a typical installation, plenum 104 is approximately 7.5 inches wide by 18 inches high at the inner portion of the spiral, increasing gradually to 18 inches wide by 18 inches high at the exhaust 103. These dimensions will vary proportionally depending on the side of the cooling tower fan in which the generator is installed.

Figure 5A:
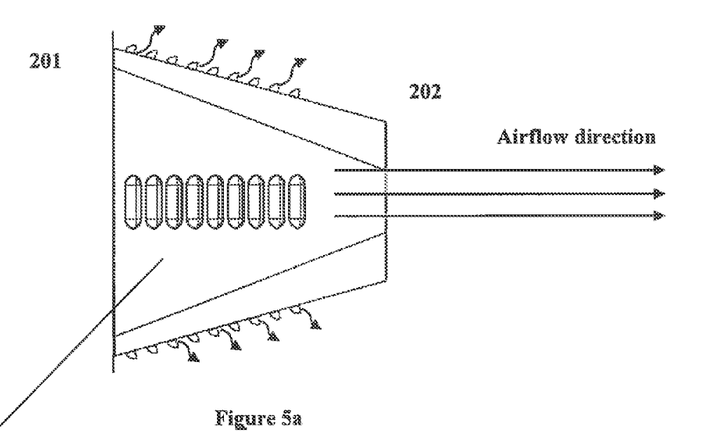
FIGS. 5a and 5b show side and front views, respectively, of the nozzle.
Figure 5B:
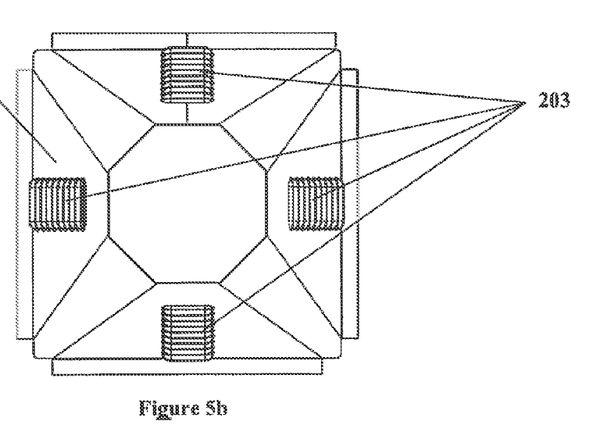

FIGS. 5a and 5b show the front and side views, respectively, of nozzle 2, which attaches directly to the exhaust 103 of generator 1. The cross section of nozzle 2 at the intake 201 is square with dimensions of 18 inches by 18 inches, while the cross section of exhaust 202 is octagonal with a width of approximately 9.4 inches. Nozzle 2 features louvers 203 on four sides. It was found that these louvers enhance the venturi effect in conjunction with venturi intake 3.

Figure 6A:
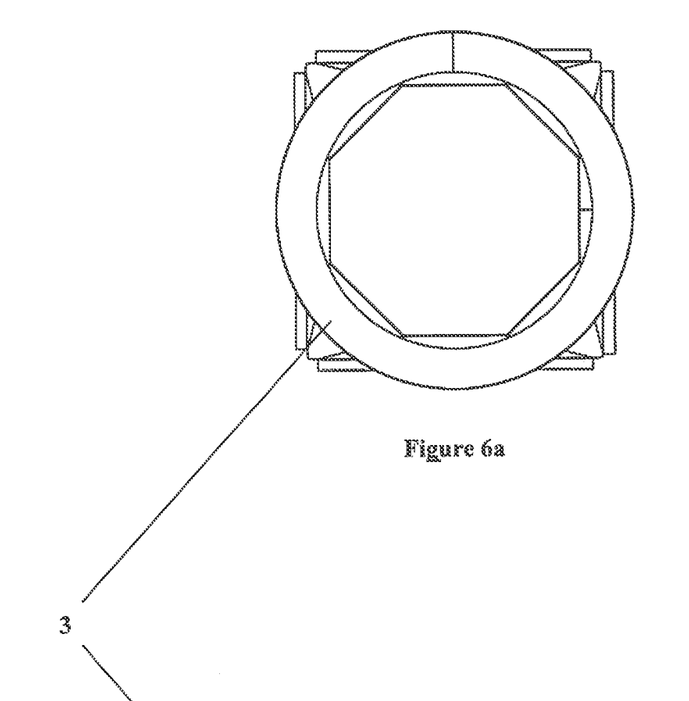
FIGS. 6a and 6b show front and side views, respectively, of the venturi intake.
Figure 6B:
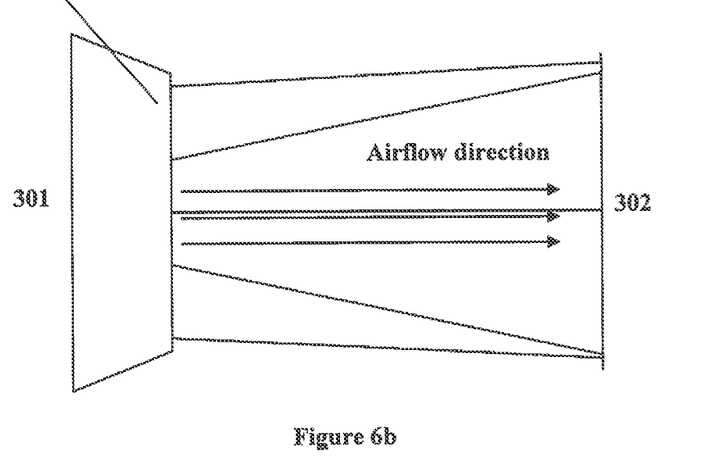

The front and side views of venturi intake 3 are shown in FIGS. 6a and 6b, respectively. The inlet side 301 of venturi intake is circular in cross-section with a diameter of 29 inches tapering down to 22.5 inches in one preferred embodiment. The overall length of venturi intake 3 is 43 inches in one embodiment. The exhaust 202 of nozzle 2 extends into the conical inlet throat 301 of venturi intake 3. The purpose of this combined assembly of nozzle 2 and venturi intake 3 is to accelerate the cooling fan exhaust air as shown in FIGS. 6a and 6b, as well as to draw in polluted ambient air from the atmosphere surrounding the cooling tower. The gap between nozzle 2 and venturi intake 3 varies from 0.5 inches at its narrowest point to 2.5 inches at its widest point. The combination of the air flow through the exhaust 202 of nozzle 2 and through the louvers 203 causes a strong low pressure region in the inlet throat 301 generated by the venturi effect. This low pressure region is what causes polluted atmospheric ambient air to be drawn into the device, as shown in FIG. 2. This polluted atmospheric air then passes through exhaust 302 of the venturi intake 3 and passes into the scrubber section 4.

Particulate matter filtration is done using a misted high pressure water curtain to knock down particulate matter in first and second scrubber sections 4, 5. The water used in the filtration process is pumped up from the cooling tower base. The cooling tower water is already chemically-treated to reduce bacteria, scale, and corrosion of the cooling tower components. The water will carry collected particulate matter to drain lines 403, 503 and then to a storage water separator as shown in FIG. 1. Once the water and particulate matter are in storage water separator, the water will be pumped to a filter system and then back into the cooling tower base. The collected solid particulate matter can then be disposed of.

Figure 7A:
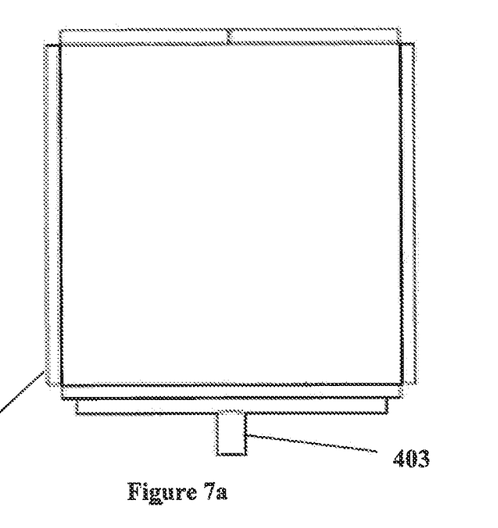
FIGS. 7a and 7b show front and side views, respectively, of the air scrubber assembly.
Figure 7B:
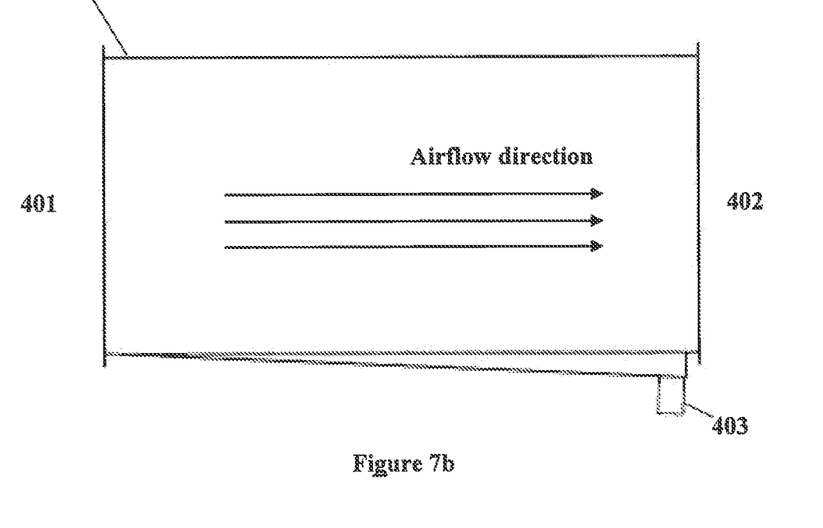

FIGS. 7a and 7b show the front and top views, respectively, of the primary scrubber section 4. Air passes through primary scrubber section 4, which has inlet 401 and exhaust 402. In one preferred embodiment, this section is 24 inches square in cross section and has a length of about 48 inches between inlet 401 and exhaust 402. Water spray nozzles are located in the first scrubber section to generate a water curtain by spraying water at high pressure into the plenum between inlet 401 and exhaust 402. This water is drawn from the cooling tower itself, as will be explained below. Pollutants in the form of both coarse and fine particulates are washed out of the air by the water curtain in the first scrubber section.

Figure 8A:
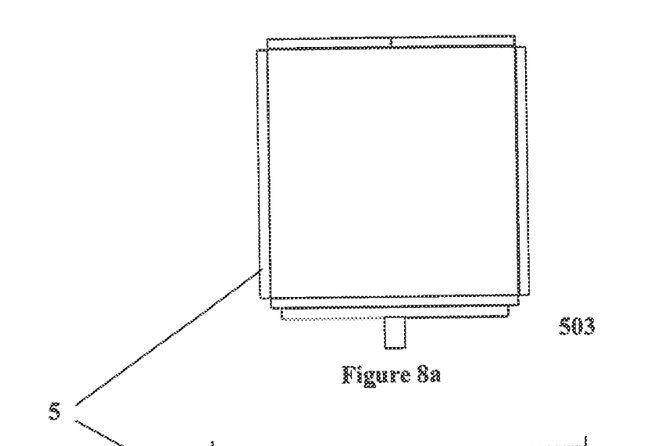
FIGS. 8a and 8b show front and side views, respectively, of the secondary drain assembly.
Figure 8B:
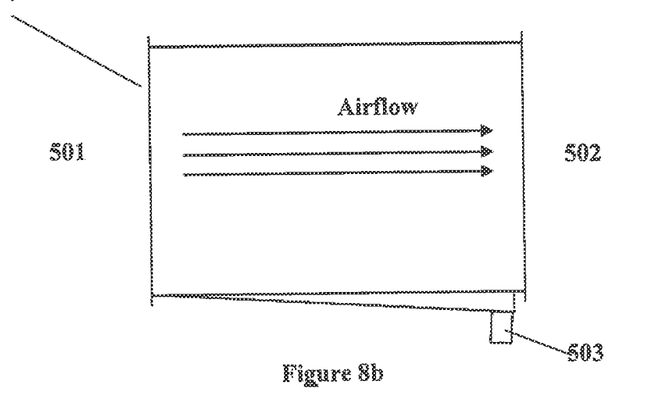

FIGS. 8a and 8b show the front and side views, respectively, of the secondary scrubber section 5, which has intake 501 and exhaust 502. The polluted air undergoes further treatment in secondary scrubber section 5 which also contains nozzles that generate a water curtain by spraying a high pressure water mist into the air stream.

In preferred embodiments, the various components of the invention are made out of 16 gauge stainless steel or recycled plastics treated with aluminum oxide due to these materials' proven ability to stand up to exposure to the elements and weather conditions for extended periods of time with little or no maintenance. The overall size of the air scrubber will vary based on the diameter of the cooling tower on which the scrubber is installed.

In the embodiment shown in FIGS. 1 and 2, the airflow is primarily linear except in generator 1. However, an alternate "cinnamon roll" configuration is contemplated where the airflow is spiral throughout. That is, venturi intake 3, and first and secondary scrubber sections 4, 5 are "wrapped around" the generator section, so that the airflow is primarily spiral. This configuration may be more desirable in some respects where space is at a premium.

It is contemplated that the invention described herein can be retrofitted with a minimum of effort onto existing cooling towers. Typically, installation involves placing the intake 102 of generator 1 directly in the path of the cooling tower exhaust air. Surprisingly, the nautilus shape of generator 1 appears to cause little or no additional load on the cooling tower fan itself. In one preliminary test of the system, the current draw on the fan decreased from 15.1 amps pre-installation to 14.7 amps with the system installed.

What is claimed is:

1. An air pollution control apparatus that reduces building cooling tower fan energy usage, comprising:
    a generator section mounted to receive the exhaust of a building cooling tower, said generator section further comprising:
        a cooling tower exhaust intake for receiving at least a portion of the exhaust air from a building cooling tower, and
        a nozzle;
    a venturi intake, further comprising:
        an atmospheric air intake, and
        an exhaust plenum; and
    wherein said generator section receives and accelerate said exhaust air from said building cooling tower through said nozzle into said venturi intake, thereby drawing atmospheric air into said atmospheric air intake and driving a mixture of said exhaust air and said atmospheric air though said exhaust plenum; and
    at least one scrubber section receiving said atmospheric air and said exhaust air from said exhaust plenum.

2. The apparatus of claim 1, further comprising a pump for pumping water from said cg tower to said at least one scrubber section.

3. The apparatus of claim 2, further comprising a filter for removing particulate matter from said water.

4. The apparatus of claim 1, further comprising an adapter for coupling at least said generator section to the exhaust of a building cooling tower fan.

5. The apparatus of claim 1, wherein the walls of said nozzle contains one or more louvers.

6. The apparatus of claim 5, wherein said cooling tower exhaust intake is a continuously curving duct having increasing cross sectional area in the direction of flow.

7. The apparatus of claim 6, wherein a portion of said nozzle extends into a portion of said venturi intake.

\* \* \* \* \*